United States Patent [19]

Gregor

[11] Patent Number: 5,313,613
[45] Date of Patent: May 17, 1994

[54] EXECUTION OF STORAGE-IMMEDIATE AND STORAGE-STORAGE INSTRUCTIONS WITHIN CACHE BUFFER STORAGE

[75] Inventor: Steven L. Gregor, Endicott, N.Y.

[73] Assignee: International Business Machines Corporation, Armonk, N.Y.

[21] Appl. No.: 92,374

[22] Filed: Jul. 15, 1993

Related U.S. Application Data

[60] Continuation of Ser. No. 713,487, Jun. 10, 1991, abandoned, which is a division of Ser. No. 292,304, Dec. 30, 1988.

[51] Int. Cl.$^5$ .......................... G06F 12/00; G06F 9/00
[52] U.S. Cl. ........................ 395/425; 364/DIG. 1; 364/243.4; 364/243.41; 364/243.42; 364/242.2
[58] Field of Search ................ 364/DIG. 1 MS File, 364/DIG. 2 MS File; 395/200, 250, 375, 400, 425, 700, 775, 800

[56] References Cited

U.S. PATENT DOCUMENTS 4,408,275 10/1983 Kubo et al. .......................... 395/425

FOREIGN PATENT DOCUMENTS 57-31048 2/1982 Japan .

*Primary Examiner*—Robert B. Harrell
*Attorney, Agent, or Firm*—Lynn L. Augspurger; Eugene I. Shkurko

[57] ABSTRACT

A cache storage system having hardware for in-cache execution of storage-storage and storage-immediate instructions thereby obviating the need for data to be moved from the cache to a separate execution unit and back to cache.

6 Claims, 10 Drawing Sheets

SOURCE OPERAND FIELD IN STORAGE

```
C0 |__|__|__|__|__|__|__|__|
80 |==|==|=_|__|__|__|__|__|
40 |__|__|__|__|__|__|__|__|
00 |__|_=|==|==|==|==|==|==|
   00  08  10  18  20  28  30  38  3F
```

SRC SFA(26:31) = 01 0010      (SOURCE OPERAND STARTING FIELD ADDRESS)
      SRCAL  = 10 1110       (LINE-BOUNDARY ALIGNMENT LENGTH)
      SRCFL  = 1000 0110     (SOURCE OPERAND FIELD LENGTH)

DESTINATION RESULT FIELD IN STORAGE

```
C0 |__|__|__|__|__|__|__|__|
80 |==|==|==|==|==|==|==|__|
40 |__|__|__|__|__|__|__|__|
00 |__|__|__|__|__|__|_=|==|
   00  08  10  18  20  28  30  38  3F
```

DST SFA(26:31) = 11 0001     (DESTINATION OPERAND STARTING FIELD ADDRESS)
      DSTAL  = 00 1111       (LINE-BOUNDARY ALIGNMENT LENGTH)
      DSTFL  = 1000 0110     (DESTINATION OPERAND FIELD LENGTH)

BYTE SHIFT AMOUNT (BSA) = (SRC SFA) - (DST SFA)        01 0010
(FOR ALL SRC FETCHES)
                                                      -11 0001
                                                      ─────────
                                                       10 0001

SOURCE OPERAND BUFFER BYTE LOAD FLAGS (SBLF)
THE ONES COMPLEMENT OF BSA REPRESENTS BOUNDARY - 01 1110

|                         | BYTES 00 0000 TO 01 1110                                      | BYTES 01 1111 TO 11 1111 |
|-------------------------|---------------------------------------------------------------|--------------------------|
| SOURCE OPERAND BUFFER B | GATE SHIFTER OUTPUT                                           | —                        |
| SOURCE OPERAND BUFFER A | IF FIRST SRC FETCH GATE SHIFTER OUTPUT, ELSE GATE SOURCE OPND BFR B | GATE SHIFTER OUTPUT      |

MOVE EXAMPLE: SRC SFA < = DST SFA

FIG. 5a

FETCH LINE SRC(00)

SOURCE OPERAND BUFFER B

| 21 | SRC FIELD | 3F | | | | | |
|----|-----------|----|----|----|----|----|----|
| 00 | 08 | 10 | 18 | 20 | 28 | 30 | 38 | 3F |

1E

SOURCE OPERAND BUFFER A

| 21 | SRC FIELD | 3F | 00 | SRC FIELD | |
|----|-----------|----|----|-----------|---|
| 00 | 08 | 10 | 18 | 20 | 28 | 30 | 38 | 3F |

1E          31          3F

DST STBF

```
SRC ADDR(24:31) = SRC ADDR + SRCAL = 0100 0000
SRCFL           = SRCFL - SRCAL    = 0101 1000
```

STORE LINE DST(00)

STORE DST LINE 00 UNDER CONTROL OF DST STORE BYTE FLAGS (STBF):

DST STBF = (DST ADDR(26:31)) TO (DST ADDR(26:31) + DSTAL)

```
DST ADDR(24:31) = DST ADDR + DSTAL = 0100 0000
DSTFL           = DSTFL - DSTAL    = 0111 0111
```

FETCH LINE SRC(40)

SOURCE OPERAND BUFFER B

| 61 | SRC FIELD | 7F | | | | | |
|----|-----------|----|----|----|----|----|----|
| 00 | 08 | 10 | 18 | 20 | 28 | 30 | 38 | 3F |

1E

SOURCE OPERAND BUFFER A

| 21 | SRC FIELD | 3F | 40 | SRC FIELD | 60 |
|----|-----------|----|----|-----------|----|
| 00 | 08 | 10 | 18 | 20 | 28 | 30 | 38 | 3F |
| 00 | | | | 1E | | | | 3F |

DST STBF

```
SRC ADDR(24:31) = SRC ADDR + 0100 0000 = 1000 0000
SRCFL           = SRCFL - 0100 0000    = 0001 1000
```

STORE LINE DST(40)

STORE DST LINE 40 UNDER CONTROL OF DST STORE BYTE FLAGS (STBF):

DST STBF = (DST ADDR(26:31)) TO (DST ADDR(26:31) + 0100 0000)

```
DST ADDR(24:31) = DST ADDR + 0100 0000 = 1000 0000
DSTFL           = DSTFL - 0100 0000    = 0011 0111
```

—MOVE EXAMPLE: SRC SFA< = DST SFA

FIG. 5b

FETCH LINE SRC(80)

SOURCE OPERAND BUFFER B

| A1 | SRC FIELD | BF | |
|----|-----------|----|----|
| 00 | 08   10   18 | 1E  20   28 | 30   38   3F |

SOURCE OPERAND BUFFER A

| 61 | SRC FIELD | 7F | 80 | SRC FIELD | A0 |
|----|-----------|----|----|-----------|-----|
| 00 | 08   10   18 | 1E  20   28 | 30   38   3F |

00                                    1E                    37
                                                            DST STBF

SRC ADDR(24:31)  = SRC ADDR + SRCFL+1 = 1001 1001

SRCFL = SRCFL − 0100 0000 = 1101 1000 ⏋
                                      WRAP THROUGH ZERO INDICATES
                                      SRC FIELD DEPLETED

STORE LINE DST(80)

STORE DST LINE 80 UNDER CONTROL OF DST STORE BYTE FLAGS (STBF):
  DST STBF = (DST ADDR(26:31)) TO (DST ADDR(26:31) + DSTFL)

DST ADDR(24:31) = DST ADDR + DSTFL+1 = 1011 1000
  DSTFL = DSTFL − 0100 0000 = 1111 0111 ⏋
                                        WRAP THROUGH ZERO INDICATES
                                        SRC FIELD DEPLETED

FIG. 5c

SOURCE OPERAND FIELD IN STORAGE

|    | 00 | 08 | 10 | 18 | 20 | 28 | 30 | 38 |
|----|----|----|----|----|----|----|----|----|

SRC SFA(26:31) = 10 1101
SRCAL = 01 0011
SRCFL = 0011 0000

DESTINATION RESULT FIELD IN STORAGE

|    | 00 | 08 | 10 | 18 | 20 | 28 | 30 | 38 |
|----|----|----|----|----|----|----|----|----|

DST SFA(26:31) = 01 1000
DSTAL = 10 1000
DSTFL = 0011 0000

BYTE SHIFT AMOUNT (BSA) = (SRC SFA) - (DST SFA)     10 1101
(FOR ALL SRC FETCHES)                             - 01 1000
                                                    ‾‾‾‾‾‾‾
                                                    01 0101

RESULT INDICATES SECOND SRC
FETCH REQUIRED BEFORE FIRST
DST STORE

SOURCE OPERAND BUFFER BYTE LOAD FLAGS (SBLF)
THE ONES COMPLEMENT OF BSA REPRESENTS BOUNDARY - 10 1010

|  | BYTES 00 0000 TO 10 1010 | BYTES 10 1011 TO 11 1111 |
|---|---|---|
| SOURCE OPERAND BUFFER B | GATE SHIFTER OUTPUT | — |
| SOURCE OPERAND BUFFER A | IF FIRST SRC FETCH GATE SHIFTER OUTPUT ELSE GATE SOURCE OPND BFR B | GATE SHIFTER OUTPUT |

FIG. 6a

FETCH LINE SRC(00)

SOURCE OPERAND BUFFER B

| 15 | SRC FIELD | 3F | |
|---|---|---|---|
| 00 08 10 18 20 | 28 | 30 38 | 3F |

2A

SOURCE OPERAND BUFFER A

| 15 | SRC FIELD | 3F | 00 | SRC FIELD | 14 |
|---|---|---|---|---|---|
| 00 08 10 18 20 | 28 | 30 38 | 3F |

2A

```
SRC ADDR(24:31)  = SRC ADDR + SRCAL   = 0100 0000
SRCFL            = SRCFL    - SRCAL   = 0001 1101
```

FETCH LINE SRC(40)

SOURCE OPERAND BUFFER B

| 55 | SRC FIELD | 7F | |
|---|---|---|---|
| 00 08 10 18 20 | 28 | 30 38 | 3F |

2A

SOURCE OPERAND BUFFER A

| 15 | SRC FIELD | 3F | 40 | | 54 |
|---|---|---|---|---|---|
| 00 08 10 18 20 | 28 | 30 38 | 3F |

└── 18 ────── 2A ────── 3F ┘

DST STBF

```
SRC ADDR(24:31)  = SRC ADDR + SRCFL+1 = 0101 1110
SRCFL            = SRCFL    - 0100 0000 = 1101 1101
```

WRAP THROUGH ZERO INDICATES
SRC FIELD DEPLETED

STORE LINE DST(00)

STORE DST LINE 00 UNDER CONTROL OF DST STORE BYTE FLAGS (STBF):
   DST STBF = (DST ADDR(26:31)) TO (DST ADDR(26:31) + DSTAL)

```
DST ADDR(24:31)  = DST ADDR + DSTAL = 0100 0000
DSTFL            = DSTFL    - DSTAL = 0000 1000
```

NO WRAP THROUGH ZERO AND
SRC FIELD DEPLETED
INDICATES ONE MORE
DST STORE REQUIRED

CONDITION CAUSES NEXT
DST STORE TO GATE
SOURCE OPERAND BUFFER B
TO A PRIOR TO STORE

MOVE EXAMPLE: SRC SFA>DST SFA

FIG. 6b

STORE LINE DST(40)

SOURCE OPERAND BUFFER B

| 55 | SRC FIELD | 7F | |
|---|---|---|---|
| 00  08  10  18  20  28 | | 30  38  3F |

2A

SOURCE OPERAND BUFFER A

| 55 | SRC FIELD | 7F | 40 | SRC FIELD | 54 |
|---|---|---|---|---|---|
| 00  08  10  18  20  28 | | 30  38  3F |

|00  08|
   DST STBF
                2A

STORE DST LINE 40 UNDER CONTROL OF DST STORE BYTE FLAGS (STBF):

DST STBF = (DST ADDR(26:31)) TO (DST ADDR(26:31) + DSTFL)

DST ADDR(24:31) = DST ADDR + DSTFL+1 = 0100 1001
   DSTFL = DSTFL - 0100 0000 = 1100 1000 ⏋

WRAP THROUGH ZERO INDICATES
                                                DST FIELD DEPLETED

MOVE EXAMPLE: SRC SFA>DST SFA

FIG. 6c

EXECUTION OF STORAGE-IMMEDIATE AND STORAGE-STORAGE INSTRUCTIONS WITHIN CACHE BUFFER STORAGE

The application is a continuation, of application Ser. No. 07/713,487, filed Jun. 10, 1991, now abandoned which is a division of Ser. No. 292,304, filed Dec. 30, 1988.

TECHNICAL FIELD

This invention is directed to a computing system having cache storage which includes logic circuitry for in-cache execution of instructions which would otherwise require access to the main storage unit and the attendant delays.

In particular, the invention relates to a specialized cache storage system in which dedicated logic within the cache itself serves to execute IBM System/370 Storage-Immediate and Storage-Storage instructions with a separate ALU within the cache storage unit without moving the data from storage to the system execution unit and back to storage.

BACKGROUND ART

The pipelined processor organization is recognized as providing substantial advantages over conventional systems. Likewise, the use of high speed cache storage systems to obtain a better match between processor speed and memory cycle times has been effective to improve the performance of computing systems. Later development led to the incorporation of cache storage in pipelined processor systems, providing further improved performance. A conventional cache storage system often takes more cycles to execute certain types of IBM System/370 370-XA instructions simply because the data must be moved from storage to the execution unit and back to storage. Such operations may encounter interference by use of common data and/or data paths between successive operations with the cache. For example, with convention systems, in the case of a storage-immediate instruction, the data must be fetched from cache, requiring that the operation to be performed must wait for the fetch operation. The operation is performed and the results are stored to cache. If a common bidirectional data path is used to fetch and store data within cache, further delays may result. A cycle diagram for such an operation with conventional execution in the execution unit and with execution within cache according to the invention are shown below.

| Conventional Execution | | | | | | |
|---|---|---|---|---|---|---|
| fetch request | access cache & directory for fetch | fetch transfer to E-unit | execute operation | store transfer to cache | access cache directory for store | access cache for store |
| Execution in Cache | | | | | | |
| store immediate request | access cache & directory for fetch and store | execute operation | | | | |
| | access cache for store | | | | | |
| | store transfer | | | | | |

-continued

| |
|---|
| to cache |

Such operations as those listed under the conventional execution approach for storage-immediate instructions are required for storage-storage instructions as well. It can be seen how the execution of such operations, even when pipelined, can be stretched into large numbers of cycles by virtue of the fact that data must move between different hardware units to perform the different operations. The fact that a fetch requires use of the cache data array and address array (directory) in the same cycle, while a store requires access to the cache address array in the cycle prior to the storing of results in the cache data array, leads to contention for the cache resources.

U.S. Pat. No. 4,437,149 shows a data processing system utilizing separate cache memories for data and instructions. The system includes an instruction decode means located astride the bus from main memory to the instruction cache to at least partially decode the instruction and store the result of the decode in the instruction cache. The system does not function to execute instructions on data located in the cache.

In the pipelined processor shown in U.S. Pat. No. 4,471,432, the instructions are examined prior to execution and dispatched to the appropriate processor for execution. There is no showing of cache in which the instructions are executed.

U.S. Pat. No. 4,516,203 describes a cache system which uses special codes to designate encacheable data items. There is no showing of cache in which the instructions are executed.

The system described in U.S. Pat. No. 4,734,852 incorporates a register file in which processor and storage. accesses are overlapped to allow data references to storage in parallel with instruction execution. Loads and stores against the register file are partially executed or suspended if the program requires use of the data not yet loaded. The system does not show the execution of instruction in a cache.

U.S. Pat. No. 4,747,044 describes a system in which high level instructions are executed directly by microcode which is contained in main storage. There is no showing of a cache system within which instructions are executed.

The pipeline computing system of U.S. Pat. No. 4,750,112 relates to a pipeline processor which has an instruction pipeline and an execution pipeline which are used with a microcode controlled instruction execution unit. There is no showing of a cache system which allows execution of instructions within.

In U.S. Pat. No. 4,775,936, a two cycle memory is shown which permits write requests to be enqueued in a fashion which allows instruction execution to proceed unimpeded. The processor is permitted to fetch from the write queue. There is no showing of instruction execution in the cache storage unit.

The article "Effective Execution of Multicycle Instruction in One Processor Cycle" by J. H. Pomerene, T. R. Puzak, R. N. Rechtschaffen, and F. J. Sparacio, in the *IBM Technical Disclosure Bulletin,* Vol. 26, No. 9, February 1984, at pages 4667–4668, describes a cache system which reduces a store multiple instruction to one processor cycle which is used to validate a copy of the general purpose registers in the cache. The system does not show the execution of an instruction within the cache unit.

None of the systems known in the prior art avoids the need to pass data contained in the cache to the execution unit for the execution of logical operations essential to the IBM System/370 storage-immediate and storage-storage type instructions. The time required for the transfer of data to the execution unit extends the execution time for completion of the instruction. An additional problem frequently arises due to the interference encountered within the pipeline stages of the system. These problems have prevented full utilization of the cache storage system within a pipeline processor organization.

SUMMARY OF THE INVENTION

It is therefore an object of the invention to provide an improved cache system for use within a data processing system having a pipeline processor organization.

It is another object of the invention to provide a cache system which obviates the need to send data to the execution unit in the performance of certain types of storage related instructions.

It is still another object of the invention to provide a cache storage system which includes logic for the in-cache execution of certain types of storage related instructions.

A still further object of the invention is to provide a cache storage system which minimizes the potential for interference within the stages of a pipeline processor.

Still another object of the invention is to provide a cache storage system which eliminates the need for use of the execution unit of a pipeline processor in the performance of certain types of storage related instructions.

These and other objects of this invention are realized by the use of a cache storage system which contains sufficient logic to permit the execution of a limited instruction set without the need to transfer data to the execution unit of the system. The cache logic accommodates the execution of IBM System/370 storage-storage and storage-immediate instructions with the movement of data from the cache to the execution unit, thereby eliminating the potential for interference within the pipeline stages of the system and reducing the time required for execution of the instruction. An intended benefit results from the nature of the data path within the cache system. In typical cache systems, the data path is wider than in the rest of the system. This is, of course, to improve the performance of the system from a speed standpoint. By executing the entire storage-storage and storage-immediate instructions entirely within the confines of the cache system, it is possible to utilize the wider data path of the cache system to further reduce the number of cycles required for completion of the instruction, thereby increasing the performance over and above what would normally be expected from the faster cycle time alone.

The instructions are implemented with a new operation code, which is decoded in the processing unit, either by the instruction fetching unit or the execution unit. Based on the op-code, a system (sequence) of hardware controlling instructions (microinstructions) are executed. For each of the storage-storage and storage-immediate instructions, a different microinstruction stream is executed. These instructions are interpreted by the logic unit to control its operation and inform the cache to execute line operations as opposed to normal fetch/store operations.

BRIEF DESCRIPTION OF THE DRAWINGS

FIGS. 5a, 5b, and 5c illustrate the operation of the storage-storage instruction move.

FIGS. 6a, 6b, and 6c illustrate the operation of another storage-storage instruction.

DETAILED DESCRIPTION OF THE INVENTION

IBM System/370 storage-storage instructions operate on two operands, both of which reside in real storage. The storage-storage (SS) instructions which are executed within cache buffer storage according to this invention fall into two categories: "move" which includes those SS instructions which copy a storage field from one location to another; and "logical" which are those requiring that both operand be fetched, a logical operation be performed with the two operands and the result be returned to storage. Operand one is the destination operand (DST) as it is the location stored into by all SS instructions. Operand one may be fetched for the logical instructions. Operand two is the source operand (SRC) as it is always fetched from storage.

Figure 2:
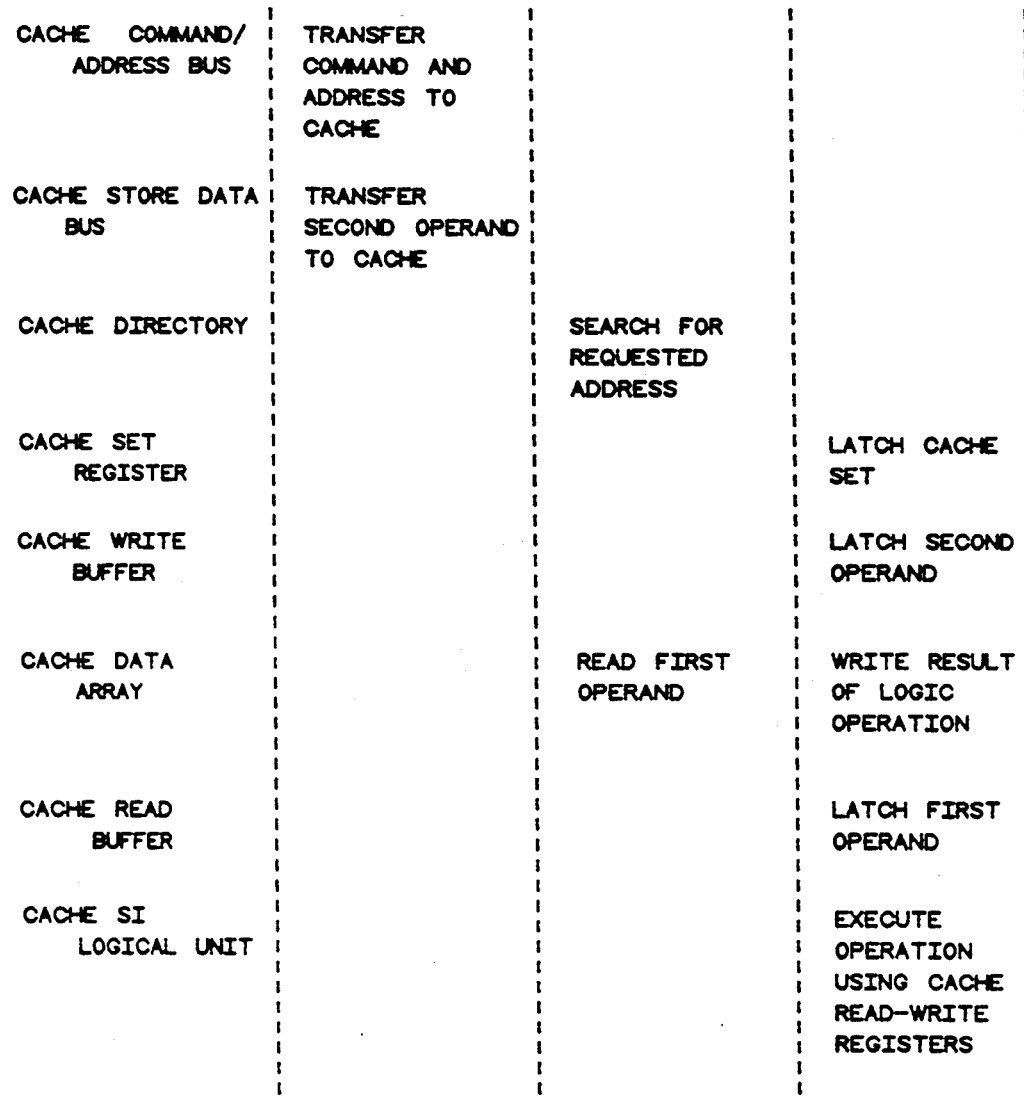
FIG. 2 is a diagram illustrating the timing of the storage-immediate instruction performed according to the invention.
Figure 3:
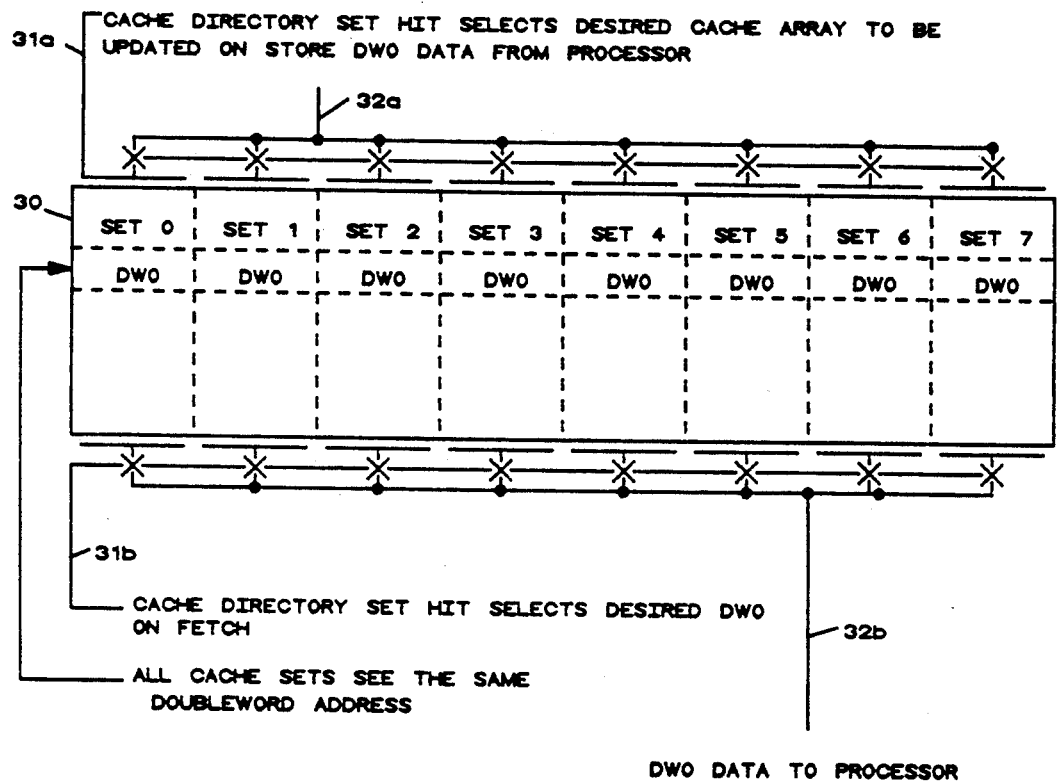
FIG. 3 is a diagram illustrating the cache buffer organization for an 8 byte access to the cache storage unit.

The organization of the cache system used in the preferred embodiment is set forth in FIGS. 2 and 3. The cache is an 8-way set associative cache with 64 byte lines as shown, with cache lines loaded in an interleaved fashion into the arrays. With reference to FIG. 3, normal fetch accesses to cache 30 read 8 bytes from all selected cache sets simultaneously and the desired data is selected based on the cache set identified from the cache directory search. The fetch operation is fast since the cache data array and the cache directory, now shown in FIG. 3, are searched in the same cycle. The cache directory hit on line 31b selects the desired doubleword on the fetch cycle to place the data on the output data bus 32b. All cache sets see the same double word address.

In the case of a store operation, the cache set must be identified on line 31a before the write, which may be from one to eight bytes wide on input data bus 32a, to the cache. The data to be written is supplied from the processor other source to data input bus 32, from which it is written into cache 30.

Figure 4:
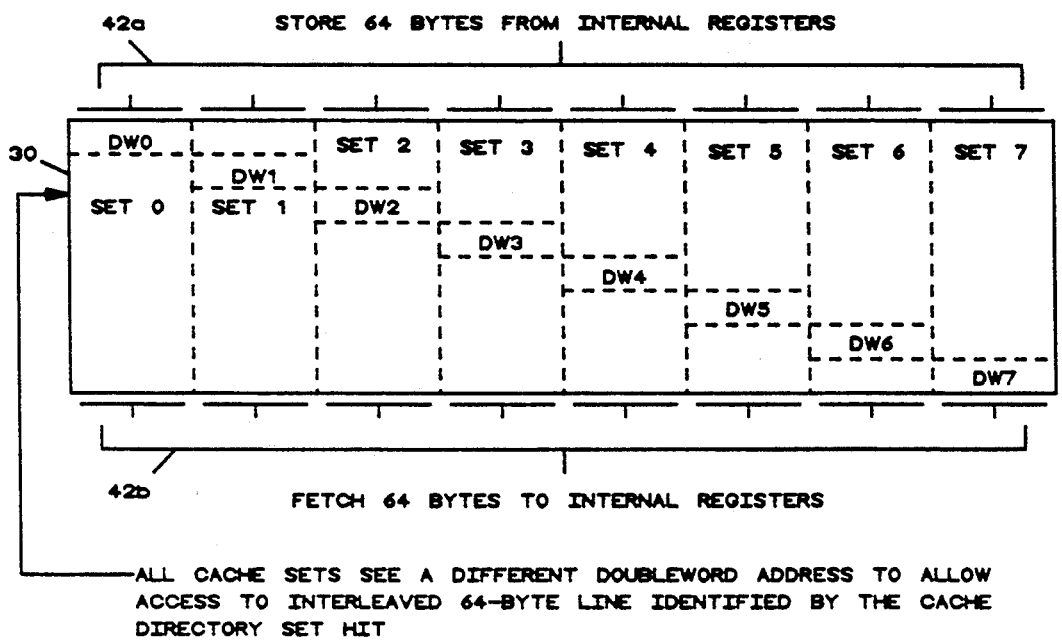
FIG. 4 is a diagram illustrating the cache buffer organization for a line access to the cache storage unit.

The interleaved organization of the cache is shown in FIG. 4. This organization provides a fetch line command and a store line command which provide improved SS instruction performance. Since the fetch command uses the doubleword operand address to access all eight cache sets in parallel, up to 64 bytes of information can be simultaneously accessed and made available to cache internal registers on fetch bus 42b. With the interleaved organization of the 64-byte cache line, in the case where the cache set is known prior to the cache data array access, 64 bytes of information from the desired cache line can be fetched in a single cache data array access through manipulation of the cache address bits 26-28 referencing each cache set.

Normally the address bits 26:28, which select a doubleword, are gated straight into the cache on a read. Since the cache lines are interleaved to allow 64-byte writes and reads in a single cycle, a line read produces all cache sets with a single doubleword from each line in each cache set:

DWx$^n$ where x=doubleword number within cache line
n=interleaved cache set number For an 8-byte set-associate fetch, AA26:28 equals a common value for all sets. This is the doubleword address of the 8 bytes of data within the cache line within each cache set. The cache set selected as the true bit may require shifting the array position for the interleaved cache set based on AA26:28.

|     | set0 | set1 | set2 | set3 | set4 | set5 | set6 | set7 |
|-----|------|------|------|------|------|------|------|------|
| 000 | DW0$^0$ | DW0$^1$ | DW0$^2$ | DW0$^3$ | DW0$^4$ | DW0$^5$ | DW0$^6$ | DW0$^7$ |
| 001 | DW1$^7$ | DW1$^0$ | DW1$^1$ | DW1$^2$ | DW1$^3$ | DW1$^4$ | DW1$^5$ | DW1$^6$ |
| 010 | DW2$^6$ | DW2$^7$ | DW2$^0$ | DW2$^1$ | DW2$^2$ | DW2$^3$ | DW2$^4$ | DW2$^5$ |
| 011 | DW3$^5$ | DW3$^6$ | DW3$^7$ | DW3$^0$ | DW3$^1$ | DW3$^2$ | DW3$^2$ | DW3$^3$ |
| 100 | DW4$^4$ | DW4$^5$ | DW4$^6$ | DW4$^7$ | DW4$^0$ | DW4$^1$ | DW4$^2$ | DW4$^3$ |
| 101 | DW5$^3$ | DW5$^4$ | DW5$^5$ | DW5$^6$ | DW5$^7$ | DW5$^0$ | DW5$^1$ | DW5$^2$ |
| 110 | DW6$^2$ | DW6$^3$ | DW6$^4$ | DW6$^5$ | DW6$^6$ | DW6$^7$ | DW6$^0$ | DW6$^1$ |
| 111 | DW7$^1$ | DW7$^2$ | DW7$^3$ | DW7$^4$ | DW7$^5$ | DW7$^6$ | DW7$^7$ | DW7$^0$ |

To read all of the cache line (64 bytes) of the interleaved entry in each cache set requires that the doubleword addresses shown below are sent to each cache set array.

The cache set array column in the following table corresponds to the sets listed horizontally in the immediately preceding chart. They represent the physical arrays addressed within the subsystem. The horizontal scale in the following represents the interleaved cache set for a line access.

| cache set array | 0 26:28 | 1 26:28 | 2 26:28 | 3 26:28 | 4 26:28 | 5 26:28 | 6 26:28 | 7 26:28 |
|---|---|---|---|---|---|---|---|---|
| 0 | 000 | 111 | 110 | 101 | 100 | 011 | 010 | 001 |
| 1 | 001 | 000 | 111 | 110 | 101 | 100 | 011 | 010 |
| 2 | 010 | 001 | 000 | 111 | 110 | 101 | 100 | 011 |
| 3 | 011 | 010 | 001 | 000 | 111 | 110 | 101 | 100 |
| 4 | 100 | 011 | 010 | 001 | 000 | 111 | 110 | 101 |
| 5 | 101 | 100 | 011 | 010 | 001 | 000 | 111 | 110 |
| 6 | 110 | 101 | 100 | 011 | 010 | 001 | 000 | 111 |
| 7 | 111 | 110 | 101 | 100 | 011 | 010 | 001 | 000 |

The DWO data to the processor lines differ from the Fetch 64 Bytes to Internal Registers in the way that the data are multiplexed. In the former case, the data wanted are only a doubleword, and all cache sets are read from the same AA26:28 with the final selection done after the cache read. For the line access, the cashe set is known and AA26:28 to each cache set is altered to allow an entire cache line to be read from an interleaved cache set.

Similarly, the store bus 42a, which leads from cache internal registers to the write inputs of the cache 30, can be used to store from one to sixty-four bytes, under the control of store byte flags, into a single cache line during a single cache data array access.

Figure 1:
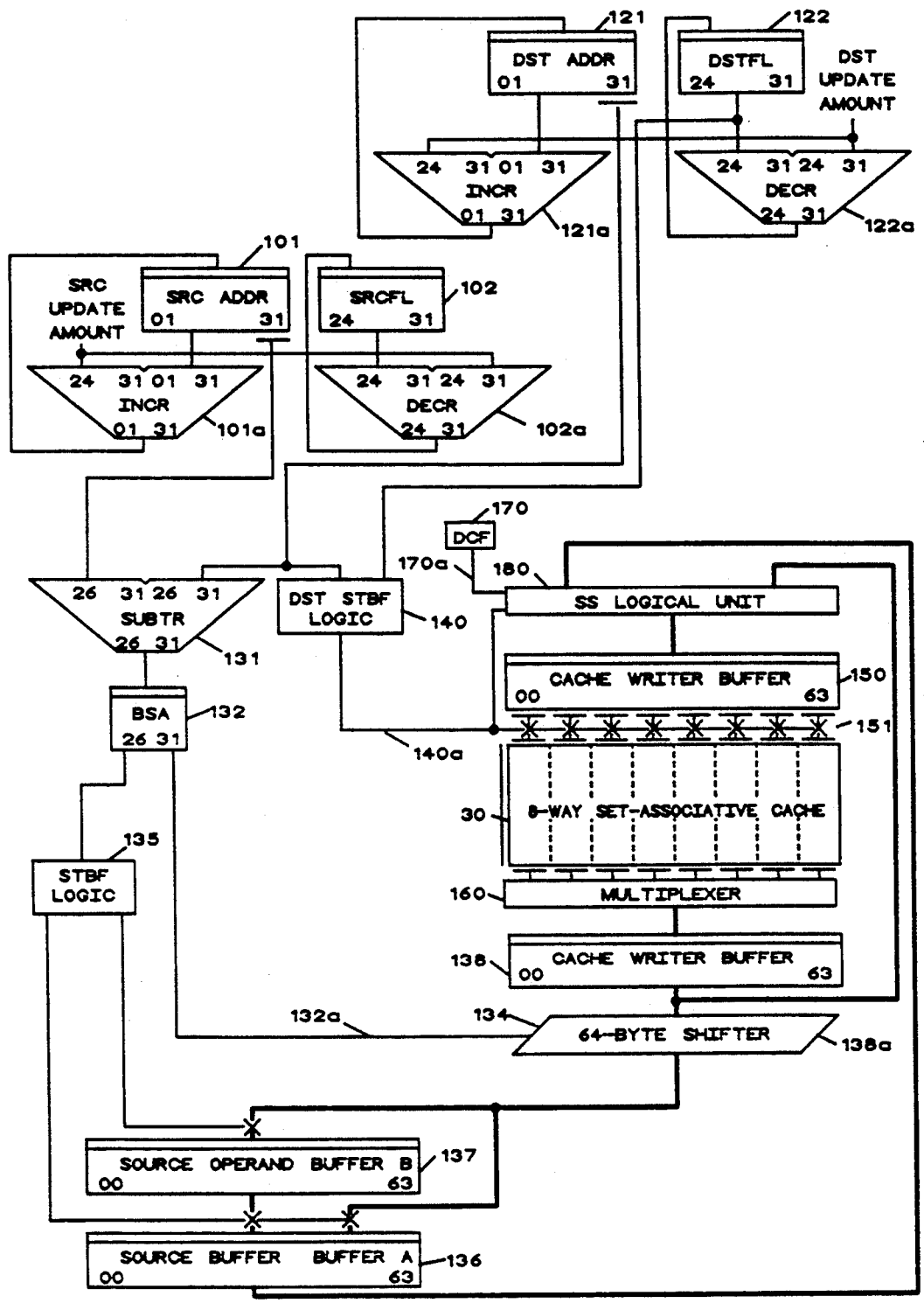
FIG. 1 is a diagram of the cache system including the instruction line-processing hardware.

It will be appreciated that the showing of FIGS. 3 and 4 is primarily functional in nature and the lines characterized as busses 32a, 32b, 42a, and 42b are actually implemented as part of the cache write buffer and the cache read buffer as will be evident from the description of the hardware shown in FIG. 1.

The hardware for implementation of the preferred embodiment of the invention includes the 8-way set-associative cache 30 having the functional characteristics previously described. A source operand address register (SRC ADDR) 101 and destination operand address register (DST ADDR) 120 which hold the address values for the storage locations of the source and destination operands, respectively. The source operand field length register (SRCFL) 102 and the destination operand field length register (DSTFL) 122 contain the field length values for the source and destination operands, respectively. The initial line boundary alignment values (SRCAL) and (DSTAL), are generated by taking the two's complement of the address bits 26:31 of the appropriate address register SRC ADDR or DST ADDR. These are used only as. part of the initial access for that operand and do not require latches to maintain them. Subtraction circuit 131, located in the cache storage, is used to calculate the alignment difference between the starting address of the source operand and destination operand within a cache line (64 byte) boundary, modulo 64 difference. The difference is latched into BSA register 132 and supplied over output line 132a to the 64-byte shifter 134 which then aligns the source data to the destination address on all source operand line fetches.

The starting address difference developed by subtractor 131 is also used by source operand buffer load flag logic (SBLF) 135 to develop source operand buffer load flags at the start of the instruction for use throughout execution of the instruction.

Source operand buffer A 136 and source operand buffer B 137 are both 64 bytes long so that the entire field of source data from the 64-byte shifter 134 may be accommodated. Source operand buffer B 137 is loaded only from the output of shifter 134 while source operand buffer A 136 may be loaded from either the output of shifter 134 or from buffer 137. The source of data loaded into buffer 136 is controlled according to the buffer load flags developed and stored in logic 135.

The starting address difference stored in BSA register 132 also identifies the relative alignment of the source and destination operand starting addresses within a cache line. This information is used to provide the proper sequencing of fetch requests. For example, if the destination operand starts to the left of the source operand, modulo 64, two source operand fetches are required to access sufficient data to fill the first destination store line request. If the destination operand starts to the right of the source operand, only a single source operand fetch is initially required to provide sufficient data to satisfy the request.

The address of the destination operand and its associated field length are used by the store byte flag logic 140 to generate destination store byte flags (DST STBF).

The destination store byte flags are used to control the data bytes actually stored on each destination operand store line command. The output signal on line 140a from store byte flag logic 140 extends the gating circuitry 151 between the cache write buffer 150 and cache 30. The store byte flags also determine which bytes are inspected for returning condition code setting status to the processor. The destination store byte flags are generated in several ways. For the first store operation, the bytes stored are from the byte identified by the starting DST address, AA26:31 of the DST ADDR, through the DST ADDR plus DSTAL if DSTFL is greater than DSTAL initially or from DST ADDR through DST ADDR plus DSTFL, if DSTFL is less than or equal to DSTAL. For subsequent stores, as long as DSTFL is greater than 64, all 64 store byte flags are activated. When DSTFL is less than 64, the DST store byte flags activated are from DST ADDR 26:31 through DST ADDR 26:31 plus DSTFL. Basically, byte zero through the remaining field length. The byte flags, as well as data, must be aligned according to the cache set just prior to the actual cache line write.

A digit control flag (DCF), which is stored in the digit control register 170, is effective to assist merging left-most and right-most digits within a byte from the source and destination operands by means of the signal on bus 170a leading to the storage-storage logic unit 180. The digit control flag is based on the operation code of the System/370 instructions. Certain instructions, such as MOVE NUMERICS, MOVE ZONES, etc., require moving only the left or right half of each bytes. The DCF latches are set at the start of each SS operation to control which digits are updated:

00—invalid
01—right digit
10—left digit
11—both digits or entire byte

The total length of the data to be stored in any particular IBM System/370 XA instruction or unit of operation may be up to 256 bytes. Since each line access may process up to 64 bytes, several iterations through a microcode loop may be required. The microcode loop includes provision for updating the address and field length registers at each iteration according to the amount of data processed by the instant iteration, thereby accommodating the entire desired data field.

Other hardware elements in the preferred embodiment include source operand address increment logic 101a which operates to increment the value of source operand address in source operand address register 101. Corresponding increment logic 121a exists for the purpose of incrementing the value of the destination operand address in destination operand address register 121. The operation of the increment logic 101a and 121a is under the control of signals developed by either hardware or microinstruction decode. If controlled by hardware, a latch indicating first or subsequent line access for each operand must be maintained. Alternatively, if under microcode control, simple decode of the increment control field identifies the appropriate increment value. In either case, the first increment for both operands always uses the line-boundary alignment length for the first increment value. Thereafter, the increment value is the lesser of 64 and the appropriate field length register value.

Decrement logic 102a is connected to the source operand field length register 102 to provide for decrementing the value in the field length registered as processing progresses through the field.

Similar decrement logic 122a is associated with the destination operand field length register 122 to provide for decrementing the value in this register as processing proceeds.

The purpose of the cache multiplexor 160 is to align the 64 bytes of data read from the interleaved cache set into the 64-byte cache read buffer, such that bytes zero through 63 of the cache set are in the corresponding byte positions of the cache read buffer. As byte zero starts in a different array for each cache set, the data must be aligned according to the interleaved cache set read prior to entering the 64-byte shifter. This could be considered as a doubleword shifter. The doublewords read from the cache set are shifted to the proper position based on the cache set hit from the directory access. Cache set 0 gates the doublewords straight through; cache set 1 shifts the doublewords left one position; cache set 2 shifts the doublewords left two positions; etc.

A timing diagram for the previously described storage-immediate instructions hardware is shown in FIG. 2. The various hardware elements are set forth in the left-most column. The three primary cycles are shown in the three columns to the right. It will be appreciated that normal store operations are preceded by a cycle for the search of the cache directory to determine if the desired data is in cache 30. This search allows selection of the proper cache for storing. The cache data array is idle during the cache directory search cycle. This allows the fetching of the first operand to be made in the same cycle as the search for the requested address. During the second cache cycle, which is the normal data store cycle, represented by the right-most column, the desired logical operation is performed on one byte of the data and the result is stored into the selected cache set. The condition code information is also returned to the program status word during this operation. The condition code, a part of the program status word (PSW) can be set based on a number of input conditions. Some of the conditions are generated from the SS logic unit 180. Microinstructions can specify which conditions are to be used to generate the condition code at the conclusion of an instruction. For the SS logical unit, the following conditions are fed to the condition code generation hardware:

result field zero or not zero
selected bits all ones

This information is accumulated as the storage destination field is stored to cache and used to set condition code hardware at the end of the instruction. A signal feeds from the SS logical unit 180 to the condition code hardware.

FIGS. 5a–5c are illustrative of the SS Instruction Move Example: SRC SFA less than or equal to DST SFA. For this type of instruction, only the source operand is fetched and stored into the destination location. If the starting address of the source operand is to the left of the destination address or equal to it (modulo 64), only a single source line fetch is issued initially, otherwise two must be issued. The data are accessed by first searching the cache directory to identify the cache set, and then using this information to fetch the required 64-byte line into the cache read buffer. The data are shifted according to the difference between the source and destination starting addresses, and loaded properly aligned into source operand buffers 136 and 137 according to the source operand buffer byte load flags contained in buffer load flag logic 135.

When the destination data overflows the right-hand boundary of the source operand buffer 136 into source operand buffer 137, a store line command is issued using the destination address contained in DST ADDR 121. This store occurs by first searching the cache director, then aligning the data through cache SS logical unit 180 in preparation for the line write into cache 30. The store occurs under control of the destination operand store byte flags through the destination operand store byte flag logic 140. After each line access, the appropriate address and field length registers are updated according to the amount of data processed in that access. Under microinstruction control, each piece of hardware, the SRC and DST addresses and corresponding field lengths, is told how to perform its update and part of each storage access. The first increment for an address and decrement for the corresponding field length always uses the appropriate line-boundary alignment length. Thereafter, the increment value for an address and decrement value for the corresponding field length is the lesser of 64 and the appropriate field length register value.

Fetch and store line commands continue to be issued in the execution of the storage-storage MOVE operations until both storage fields are depleted. The loops are made up of microinstructions stored in a separate, conventional, microinstruction control storage unit which is used to control the hardware for each IBM System/370 instruction. Each such IBM System/370 instruction starts at a unique location in the control storage unit, thereby allowing each loop to contain a unique set of microinstructions to control the hardware and accommodate different situations within the same IBM System/370 instruction. The decoding of the microinstruction occurs in all areas of the processor and the cache which are responsive to the microinstruction requests. The basic loops appear as follows:

Cycle 1 SRC fetch line command is sent to cache control shown in FIG. 1. The instruction appears in the Instruction Register of the system and is used to address the proper location in the microinstruction control storage unit in conventional fashion. The addresses of the two storage operands are generated under microinstruction control (or hardware control) and all facilities are loaded in preparation for the storage-storage operation code handling: SRC ADDR, SRCFL, DST ADDR, DSTFL, SRCAL, DSTAL, BSA, DCF. The first microinstruction to fetch the first portion of the SRC operand is sent to the cache. The cache command register latches the line read request for the SRC operand buffers in the start of cycle two.

Cycle 2 Search the cache directory for the SRC address in accordance with conventional cache operation and signal returned on line 31 in FIG. 3.

Cycle 3 Use cache set to read SRC line from cache 30.

Cycle 4 Latch the SRC data in cache read buffer 138. Align the SRC data. Issue the DST store line command to the cache control. The data fetched for the SRC operand are aligned, left shifted with wrap through 64-byte shifter 134, and loaded into the SRC operand buffers 136 and 137 under the control of the output of SBLF logic 135. The DST line store command is read from control store and transferred to cache control.

Cycle 5 Load the SRC data into source operand buffers 136 and 137 under the control of the storage buffer load flag in the storage buffer load flag logic 135. The DST store request is latched in the cache command register. Search the cache director for the destination storage address.

Cycle 6 The output of the cache directory searched is latched in the cache hit registers to identify the interleaved cache set containing the desired data. The unlatched value is used to align the data in source operand buffer 136 into the cache write buffer 150 and write the data into cache in accordance with the DST store byte flags and the output of store byte flag logic 140.

The basic structure of the SS logical operations is the same as the SS move operations previously described, except for the fact that the destination operand must also be fetched. The fetch of the destination operand is made just prior to the destination operand store. If the starting address of the source operand is to the left of the destination address or equal to it (modulo 64), only a single source line fetch is initially issued, otherwise, two must be issued. The data are accessed by first searching the cache director to identify the cache set in accordance with conventional cache access practice. The directory information is then used to fetch the required 64-byte line from cache 30 into the cache read buffer 138. The data are shifted according to the difference between the source and destination starting addresses, and loaded properly aligned into source data operand buffers 136 and 137 according to the byte load flags in storage buffer load flag logic 135. When the destination data overflows the right-hand boundary of source operand buffer 136 into source operand buffer 137, a fetch line command using the destination address is issued.

A microinstruction branch at the initiation of the microinstruction program for the execution of the IBM System/370 instruction would look at the relative alignment of the starting addresses for the two operands (SRC ADDR 26:31 against DST ADDR 26:31) to determine if one or two SRC operand fetches are initially requested. After making the correct number of SRC operand fetches, the microprogram would issue a fetch of the DST operand, if logical operation ONLY, and then store the same address of the DST operand. The loop would then continue with SRC fetch, DST fetch if logical operation ONLY, DST store.

The data from cache read buffer 138, in this case the destination operand, and the source operand buffer 136, in this case the source operand, are used as inputs to the SS logical unit 180 over bus 138a and bus 136a. The store occurs by first searching the cache directory in conventional cache fashion, and then aligning the data through the cache SS logical unit 180 in preparation for the subsequent line write to cache 30. It is to be noted that the logical operation is performed entirely within the cache unit, thereby obviating the need for transfer of data to the execution unit of the data processing system. Both the store to cache 30 and the status returned to the processor occur under control of the destination operand storage byte flags contained in logic 140. In identifying the bytes which are to be stored back into the cache, the logic unit 140 also identifies the bytes which must participate in the status determination for the result field. Only the bytes stored are inspected for zero/non-zero status, and the cumulative status across each store request is transferred to the condition code logic. After each source operand fetch and destination operand store line access, the appropriate address and field length registers are updated according to the amount of data processed in that access.

In the execution of storage-storage logical operations, fetch and store line commands continue to be issued until both storage fields are depleted. The basic loop appears as follows:

Cycle 1 The SRC fetch line command is issued to control for cache 30.

Cycle 2 The cache directory is searched for the SRC address. The DST fetch line command is issued to the cache control.

Cycle 3 The cache set is used to read the SRC line from cache 30. The cache directory is searched for the DST address.

Cycle 4 The SRC data is latched into the cache read buffer 138. The SRC data is aligned in the shifter 134. The cache set is used to read the DST line from the cache 30. A DST store line command is issued to the control for cache 30.

Cycle 5 The SRC data is loaded into source operand buffers 136 and 137 under control of the source buffer load flags in logic 135. The DST data is latched into the cache read buffer 138. The cache directory is searched for the DST address. The designated logical operation is performed on the SRC and DST data in the SS logical unit 180.

Cycle 6 Use the cache set to align the SS logical unit 180 output data into cache write buffer 150. Write to cache 30 in accordance with DST store byte flags in destination store byte flag logic 140.

It will be appreciated that an embodiment of this invention will include many conventional components not shown in the drawing. In large measure, the specific design of such components follows conventional practice and would be dependent on the other components of the system. The detailed design and functional characteristics would follow prior art approaches to the same problem. For example, the design of the SS logical unit 180 is such that the unit can perform the logical operations AND, OR, EXCLUSIVE OR, and MOVE. The first three operations comprise the logical operations and gate both operands (SRC buffers and cache read buffer) into the SS logical unit 180. The latter uses only the SRC buffers. Such operations are well known as is the hardware for performing them.

I claim:

1. A method for accelerated processing of storage related instructions which involve data stored in a cache unit including machine executed steps of:
   processing one of said storage related instructions in order to determine whether any required operands is identified by a cache address in a data array in the cache unit;
   copying each of the required operands located in a cache buffer into a read buffer;
   loading all of the required operands including the required operands in the read buffer into a logic execution unit located within the cache unit without having to transfer the required operands from the cache unit to an execution unit associated with a central processing unit;
   copying a result produced entirely within the cache unit, by the logic execution unit, into a write buffer; and
   transferring the result from the write buffer into the data array for storage in the cache unit.

2. The method of claim 1 wherein said steps of copying into a read buffer and copying into a write buffer are carried out during multiple cache cycles in order to process multibyte operands which have a length which is greater than a data path of said read buffer and also greater than a data path of said write buffer.

3. The method of claim 1 which further includes machine executed steps of determining a relative field length of the required operands prior to an execution of an instruction.

4. The method of claim 1 wherein two required operands are both found in the data array in the cache unit, and which further includes machine executed steps of determining a starting cache address difference between the two operands, and then manipulating the operands relative to each other in order to provide proper alignment for executing a storage related instruction.

5. The method of claim 1 wherein said storage related instructions include move instruction commands for transferring a field of data from one address location to a different address location.

6. The method of claim 1 wherein said storage related instructions include instruction commands for executing AND, OR, and EXCLUSIVE OR.

* * * * *